US006242547B1

(12) United States Patent
Uschold

(10) Patent No.: US 6,242,547 B1
(45) Date of Patent: Jun. 5, 2001

(54) VINYL FLUORIDE INTERPOLYMERS OF LOW CRYSTALLINITY

(75) Inventor: Ronald Earl Uschold, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/058,831

(22) Filed: Apr. 13, 1998

Related U.S. Application Data

(60) Provisional application No. 60/043,548, filed on Apr. 15, 1997.

(51) Int. Cl.$^7$ ............... C08F 214/18; C08F 214/20; C08F 214/22; C08F 214/24; C08F 214/26
(52) U.S. Cl. ............... 526/242; 526/243; 526/247; 526/250; 526/249; 526/253; 526/254; 526/255
(58) Field of Search ............... 526/250, 247, 526/249, 242, 255

(56) References Cited

U.S. PATENT DOCUMENTS

| | | | |
|---|---|---|---|
| 2,419,009 | 4/1947 | Coffman et al. | 260/86 |
| 2,468,664 | 4/1949 | Hanford et al. | 260/86 |
| 2,599,300 | 6/1952 | Upson | 260/94.9 |
| 3,129,207 | 4/1964 | James | 260/92.1 |
| 3,265,678 | 8/1966 | Hecht | 260/92.1 |
| 3,428,618 | 2/1969 | Cooke et al. | 260/92.1 |
| 3,513,116 | 5/1970 | Sianesi et al. | 260/2.3 |
| 3,531,441 | 9/1970 | Stilmar | 260/78.5 |
| 3,637,631 | 1/1972 | Sianesi et al. | 260/92.1 |
| 3,951,913 * | 4/1976 | Kometani | 260/47 UA |
| 3,966,660 | 6/1976 | Tamura et al. | 260/29.6 F |
| 4,078,135 * | 3/1978 | Sulzbach | 526/209 |
| 4,568,773 * | 2/1986 | Ohmori | 568/615 |
| 5,229,480 | 7/1993 | Uschold | 526/217 |
| 5,284,893 * | 2/1994 | Kubo | 524/315 |
| 5,919,878 * | 7/1999 | Brothers | 526/247 |

FOREIGN PATENT DOCUMENTS

| | | | |
|---|---|---|---|
| 0 633 257 A1 | 6/1994 | (EP) | C07D/317/42 |
| 941106 * | 11/1963 | (GB) . | |

OTHER PUBLICATIONS

T. Whelan, Polymer Technology Dictionary, (1994), First Edition, 208, Chapman & Hall.*
Polymerization and Copolymerization Studies on Vinyl Fluoride, Dario Sianesi and Gerardo Caporiccio, Journal of Polymer Science, Part A–1, vol. 6, pp. 335–352 (1968).
A Study of Mechanical Heat Stability and Resistance to Thermal Degradation in Copolymers of Vinyl Fluoride with Fluoroethylenes, A. Kh. Gafurov and N. I. Yakubov, V. I. Lenin State University of Tashkent (received Apr. 19, 1986), Polymer Science U.S.S.R. vol. 29, No. 8, pp. 1895–1901, 1987.
Isomorphism Phenomena in Systems Containing Fluorinated Polymers and in New Fluorinated Copolymers, G. Natta, G. Allegra, I. W. Bassi, D. Sianesi, G. Caporiccio and E. Torti, Journal of Polymer Science, Part A, vol. 3, pp. 1263–1278 (1963).

* cited by examiner

Primary Examiner—Fred Zitomer

(57) ABSTRACT

An interpolymer consisting essentially of units derived from vinyl fluoride and at least two highly fluorinated monomers, at least one of the highly fluorinated monomers introducing into the polymer a side chain of at least one carbon atom. Films from these interpolymers have substantially reduced haze, low surface tension, and can be made to form solutions in common polar organic solvents that are stable at room temperature. The extremely low surface tensions obtained with these interpolymer films provide enhanced stain resistance and improved release properties compared to polyvinyl fluoride or known vinyl fluoride interpolymers.

17 Claims, No Drawings

VINYL FLUORIDE INTERPOLYMERS OF LOW CRYSTALLINITY

RELATED APPLICATIONS

This application claims benefit of U.S. Provisional Application Ser. No. 60/043,548 filed Apr. 15, 1997.

FIELD OF THE INVENTION

The invention is in the field of fluorinated polymers containing vinyl fluoride units, their preparation and use in making protective coatings and films with reduced haze.

BACKGROUND OF THE INVENTION

Polyvinyl fluoride (PVF) has been manufactured for many years and has found many uses as a protective film or coating over a variety of substrates providing durable and cleanable surfaces. These surfaces are often thin films with the desirable property of being transparent thereby revealing the substrates beneath the film. Alternately these films may be pigmented to provide brightly colored coverings. Current market offerings are hazy and the presence of haze in the films detracts from the aesthetic quality of these coverings and limits their utility.

The fluorine atoms in PVF are largely responsible for its properties of excellent weatherability, chemical resistance and mechanical properties. Enhancement of these properties may be achieved with polymers of higher fluorine content. One way to increase polymer fluorine content is to prepare copolymers in which tetrafluoroethylene (TFE) replaces some of the vinyl fluoride (VF). Such dipolymers have been described by Coffinan and Ford, U.S. Pat. No. 2,419,009 (1947); Sianesi and Caporiccio, J. Polymer Sci., Part A-1, 6, (1968) 335, and U.S. Pat. No. 3,513,116 (1970). The above references describe processes for producing VF/TFE dipolymers. Coffinan and Ford describe an aqueous polymerization process using benzoyl peroxide initiator in the presence of vinyl fluoride monomer, such a process requiring elevated pressures. Sianesi and Capriccio describe preparation of the dipolymers in nonaqueous media such as alcohols or alcohol/water mixtures by using organometallic compounds as initiators, which process can be carried out at substantially reduced pressures. Polymers produced from these prior art methods have nonionic end groups on the polymer chains formed. These nonionic end groups are typically alkyl or aryl and, therefore, hydrophobic in nature.

Stilmar, U.S. Pat. No. 3,531,441 (1970), reported preparation in nonaqueous media of tri- and tetra-polymers composed of VF, TFE and a neutral polymerizable vinylidene monomer free of aromatic groups and free of halogen groups attached to the vinylidene group. The interpolymers of Stilmar were also formed with nonionic end groups.

Heretofore, the prior art teachings have not addressed the need for a polymer with high fluorine content which produces films with the properties desirable for protective coverings and with minimal haze. Furthermore, there are no known solvents for PVF and VF/TFE resins at ambient temperatures. Protective surfaces using these resins were previously prepared by laminating a preformed film, requiring special equipment and expertise, or by coating using a dispersion containing a latent solvent that must be processed at excessively high temperatures. Such methods are not practical for field application of these coatings or for repair of their surfaces damaged in use.

SUMMARY OF THE INVENTION

The present invention overcomes the limitations of known polymers by providing an interpolymer of vinyl fluoride and other fluorinated monomers which has reduced crystallinity. The interpolymer is especially useful for protective surfaces by forming coatings and films from the interpolymers. Films from the interpolymers of the present invention have substantially reduced haze, low surface tension, and can be made to form solutions in common organic polar solvents that are stable at room temperature. The extremely low surface tensions obtained with these interpolymer films and coatings provide enhanced stain resistance and improved release properties compared to polyvinyl fluoride or previously prepared vinyl fluoride interpolymers.

More specifically, the present invention provides an interpolymer consisting essentially of units derived from vinyl fluoride and at least two highly fluorinated monomers, at least one of the highly fluorinated monomers introducing into the polymer a side chain of at least one carbon atom. A preferred composition is an interpolymer which consists essentially of units derived from 30–60 mol % vinyl fluoride, 10–60 mol % of at least one $C_2$ olefin selected from the group of vinylidene fluoride, tetrafluoroethylene, trifluoroethylene, and chlorotrifluoroethylene, and 0.1 to 30 mol % of at least one highly fluorinated monomer which introduces into the polymer a side chain of at least one carbon atom.

The present invention also provides blends of such interpolymers with polyvinyl fluoride, aqueous and nonaqueous dispersions and organic solutions of such interpolymers, and shaped articles, laminates and coatings formed from such interpolymers.

DETAILED DESCRIPTION

The present invention is directed to terpolymers and higher interpolymers, consisting essentially of units derived from vinyl fluoride and at least two highly fluorinated monomers, at least one of the highly fluorinated monomers introducing into the polymer a side chain of at least one carbon atom. For the purposes of the present invention, "consists essentially of" means that, while the interpolymer may contain other polymer units, the significant properties of the interpolymer are determined by the named monomer units. A preferred composition is an interpolymer which comprises 30–60 mol % vinyl fluoride; 10–60 mol % of at least one $C_2$ olefin selected from the group of vinylidene fluoride, tetrafluoroethylene, trifluoroethylene, and chlorotrifluoroethylene; and 0.1 to 30 mol % of at least one highly fluorinated monomer which introduces into the polymer a side chain of at least one carbon atom. A more preferred interpolymer comprises 20–40 mol % vinyl fluoride, 40–60 mol % of the $C_2$ olefin and 1.5–25 mol % of the highly fluorinated monomer.

Preferred highly fluorinated monomers which introduce into the polymer a side chain of at least one carbon atom useful for this invention include perfluoroolefins having 3–10 carbon atoms, perfluoro$C_1$–$C_8$alkyl ethylenes, fluorinated dioxoles, and fluorinated vinyl ethers of the formula $CY_2=CYOR$ or $CY_2=CYOR'OR$ wherein Y is H or F, and —R and —R' are independently completely-fluorinated or partially-fluorinated alkyl or alkylene group containing 1–8 carbon atoms and are preferably perfluorinated. Preferred —R groups contain 1–4 carbon atoms and are preferably perfluorinated. Preferred —R'— groups contain 2–4 carbon atoms and are preferably perfluorinated. Preferably, Y is F. For the purposes of the present invention, by highly fluorinated is meant that 50% or greater of the atoms bonded to carbon are fluorine excluding linking atoms such as O or S.

Especially preferred highly fluorinated monomers useful in this invention are perfluoroolefins, such as hexafluoropropylene; perfluoroC$_1$–C$_8$alkyl ethylenes, such as perfluorobutyl ethylene; or perfluoro(C$_1$–C$_8$alkyl vinyl ethers), such as perfluoro(ethyl vinyl ether). Preferred fluorinated dioxole monomers include perfluoro-2,2-dimethyl-1,3-dioxole (PDD) and perfluoro-2-methylene-4-methyl-1,3-dioxolane (PMD). Hexafluoroisobutylene is another highly fluorinated monomer useful in this invention.

Preferred interpolymers in accordance with the invention have a melt viscosity in the range of 100–1000 Pa·s as determined by the method described herein below. Preferred interpolymers are substantially random interpolymers. The substantially random character of the polymer is indicated by nuclear magnetic resonance spectroscopy.

By adding a termonomer having a side chain of at least one carbon atom, the polymer compositions of this invention exhibit lower melting points and heats of fusion than unmodified compositions. Bulky side groups on the terpolymer hinder formation of crystalline lattice structure. For example in comparing modified terpolymers to copolymers such as VF/TFE where the copolymer and the terpolymer have the same [VF]/[TFE] ratio, reduced crystallinity of the terpolymer is observed. As a consequence, films made from terpolymers of this invention have substantially reduced haze. In addition, they can be made into solutions in common polar organic solvents like acetone, methylethyl ketone (MEK) and tetrahydrofuran (THF) that are stable at room temperature. The third highly fluorinated monomer also serves to substantially reduce the surface tension of the films in proportion to its concentration in the modified polymer. It is preferred that the surface tension be less than 30 dyne/cm.

The vinyl fluoride interpolymers of this invention can be produced in aqueous or nonaqueous media using the initiators, reaction temperatures, reaction pressures and general processes described by Coffman and Ford; Sianesi and Capriccio, or Stilmar in the references cited above. However, the vinyl fluoride interpolymers in accordance with the invention are preferably produced in a process which introduces ionic end groups into the polymer. The interpolymers with such end groups are advantageously prepared by polymerizing VF and a fluorinated monomer in water with a water-soluble free-radical initiator at a temperature of 60 to 1 00° C. and a reactor pressure of 1 to 12 MPa (145 to 1760 psi).

The initiators form ions upon dissolution in aqueous medium, and they introduce ionic end groups into the terpolymers produced. These end groups are derived from initiator fragments which begin the polymerization process. The amount of ionic end groups present in the polymer product is generally not more than 0.05 weight %. Small spherical particles are formed that remain well dispersed in water because of the electrostatic charge on the particle surface arising from the ionic end groups. The electrostatic charge on the particles causes them to repel one another and keeps them suspended in water producing low viscosity terpolymer latices. As a consequence, the latices are fluid and stable enough to be pumped through equipment making the polymerization process easy to operate and control. The invention provides for aqueous dispersions of the interpolymers. Preferably, the viscosity of the dispersions is less than 500 centipoises (0.5 Pa·s). Preferred compositions comprise 5 to 30%, preferably 10–15%, by weight terpolymer and 95 to 70%, preferably 90 to 85%, by weight water. Such dispersions can be made more concentrated if desired using techniques which are known in the art.

Initiators useful in manufacturing interpolymer in accordance with the invention are water-soluble free-radical initiators such as water-soluble organic azo compounds such as azoamidine compounds which produce cationic end groups or water-soluble salts of inorganic peracids which produce anionic end groups. Preferred organic azoamidine initiators include 2,2'-azobis(2-amidinopropane) dihydrochloride and 2,2'-azobis(N,N'-dimethyleneisobutyroamidine) dihydrochloride. Preferred water-soluble salts of inorganic peracids include alkali metal or ammonium salts of persulfate.

For example, 2,2'-azobis(2-amidinopropane) dihydrochloride produces a terpolymer with an amidinium ion as an end group and yields terpolymer particles with a positive or cationic charge. Similarly, 2,2'-azobis(N,N'-dimethyleneisobutyroamidine) dihydrochloride produces a terpolymer with an N,N'-dimethyleneamidinium ion as an end group and yields positively charged or cationic particles. Persulfate initiators place sulfate end groups on the interpolymers which yield negatively charged or anionic particles.

Optionally, as well known to those skilled in the art of emulsion polymerization, additional ingredients may be added to the polymerization medium to modify the basic emulsion process. For example, surfactants compatible with the end groups of the polymer are advantageously employed. For instance, perfluorohexylpropylamine hydrochloride is compatible with the cationic end groups present in polymer initiated by bisamidine dihydrochloride; or anmmonium perfluorooctanoate or perfluorohexylethane sulfonic acid or its salts can be used with the polymer having anionic end groups initiated by persulfate salts. As known in the art, reducing agents such as bisulfites, sulfites and thiosulfates may be used with persulfates to lower initiation temperatures or modify the structure of the polymer ionic end group. Buffering agents, such as phosphates, carbonates, acetates and the like, may be used with persulfate initiators to control latex pH. The preferred initiators are the azobisamidine dihydrochlorides and ammonium persulfate used in combination with a surfactant, since they produce the whitest terpolymers.

The presence of the amidine hydrochloride end groups in the terpolymers of this invention is evident from their infrared spectra. The amidine hydrochloride end group in 2,2'-azobis(2-amidinopropane) dihydrochloride absorbs at 1680 cm$^{-1}$ The presence of this end group in the terpolymers is confirmed by the appearance of a band in their infrared spectra at 1680 cm$^{-1}$.

The ionic end groups on interpolymers of the present invention also play a role in nonaqueous dispersions. To be useful as protective surfaces, VF/TFE interpolymers are fabricated into films and coatings. This is often done by making a dispersion of the interpolymer in a latent solvent which does not dissolve the polymer at ambient temperatures but which reduces the temperature needed to form continuous films. This greatly facilitates manufacture of thin films 10 μm to 100 μm thick by easily permitting a dispersion of the interpolymer to be thinly spread on a substrate at ambient temperatures. The coated substrate is then heated, at which point the latent solvent coalesces the interpolymer particles into a continuous solvent-swollen gel, and then evaporates leaving a dry defect-free film. Obviously, dispersion rheology will play an important part in determining the quality of the coating or film produced. It is well known in colloid science that particle size, shape and surface energy are important factors governing dispersion rheology.

The useful latent solvents are generally polar organic liquids like propylene carbonate, N-methyl pyrrolidone, γ-butyrolactone, dimethylacetamide, dimethylsulfoxide and the like which have surface tensions near or above 35 dyne/cm. The surface tension of PVF and VF/TFE polymer films have been measured and it is found that the surface tensions decrease from 38 dyne/cm for PVF to about 26 dyne/cm for interpolymers containing 40 mol % TFE. The presence of ionic end groups on the interpolymer particle surface increases the surface energy of the particle so that it is wetted by the coalescing solvent, thus aiding in their dispersion. There may also be some electrostatic stabilization of these dispersions arising from the surface charge. In addition, the interpolymer particles of the present invention are submicrometer in size, preferably having an average diameter of 200 to 400 nm. The particles also preferably have a narrow uniform size distribution. Preferably, at least 90% of the interpolymer particles are within a range between plus or minus 10% of the average particle diameter, and more preferably, between plus or minus 5% of the average particle diameter. The interpolymer particles are preferably substantially spherical in shape. By substantially spherical is meant that the ratio of the average diameter of the particles along the major and minor axes is from 1.0:1 to 1.3:1. This morphology will allow high concentrations of interpolymer particles to be dispersed in the latent solvent while maintaining viscosities convenient for coating. In summary, the interpolymer particles with ionic end groups have a good balance of properties which facilitate the preparation of polymer dispersions. This allows production of uniform, low viscosity dispersions of the terpolymer particles which can then be used to coat particles or cast high quality thin films. Typically, viscosities measured for dispersions in latent solvents containing 20–40 weight % polymer particles at 25° C. with a cone and plate rheometer at a shear rate of 2 per sec will be in the range 500 to 10,000 centipoises (0.5 to 10 Pa·s), preferably 1500 to 3500 centipoises (1.5 to 3.5 Pa·s).

Polymers with nonionic phenyl end groups prepared by the method of Coffman and Ford produce interpolymer particles which vary in size from submicrometer to greater than 10 $\mu$m. The particles have irregular shapes and often contain channels and voids.

As is evident by the above discussion, the vinyl fluoride interpolymer compositions of this invention can be used to make high quality protective films and coatings with minimal haze on a wide variety substrates such as metal, plastic, ceramic, glass, concrete, fabric and wood. Techniques for producing such films include conventional methods of casting, dipping, spraying and painting. Normally films are deposited as wet dispersions or solutions and subsequently dried and coalesced thermally. Dispersions of this invention are also suitable for preparing powder coatings, for example, spray drying a dispersion will produce powder particles that can be electrostatically sprayed onto a substrate and fused to form a uniform coating. Alternatively, films can be melt cast and laminated to a substrate with the aid of an adhesive.

Further it has been found that vinyl fluoride interpolymers of the present invention with sufficient termonomer of at least one highly fluorinated vinyl monomer with a side chain of at least one carbon atom can form stable solutions at room temperature in many polar organic solvents such as ketones, esters and some ethers such as acetone, methylethyl ketone (MEK) and tetrahydrofliran (THF). These solutions can be coated onto substrates and allowed to air dry at ambient temperatures, making it practical to apply such coatings in the field for repair of damaged surfaces. Specifically, interpolymers of this invention will form solution coatings by processing the coatings in the temperature range of from 25° C. to 130° C. Further, interpolymers of this invention will form dispersion coatings in polar organic liquids such as propylene carbonate, N-methyl pyrrolidone, γ-butyrolactone, dimethylacetamide, dimethylsulfoxide. By applying these coatings to substrates and processing them in the temperatures range of 150° C. to 250° C., a coalesced coating is formed on the substrate.

Clear glossy coatings with minimal haze are formed from the interpolymers of this invention. It is preferred that the haze be less than about 5%. Such coatings have great application in forming decorative sheet material for use in shaped molded articles where a high gloss surface appearance (including high w distinctness of image (DOI) surface appearance) is desirable, for instance in use as exterior building panels or as outer body panels for automobiles. By casting a solution or dispersion of the interpolymers of this invention and adhering a pigmented coating to the cast film as described in the prior art including U.S. Pat. Nos. 4,931,324; 4,810,540; 4,934,680, a decorative sheet and a molded article made therefrom having a glossy appearance of a base coat/clear coat automotive paint finish can be formed. Likewise a pigmented solution or dispersion of the interpolymers of this invention can be cast and used in conjunction with a bonding film to form the decorative sheet material and molded articles described in U.S. Pat. Nos. 5,536,539 and 5,514,427.

Films and coatings of the interpolymers of this invention have low surface tensions making them valuable for items such as release sheets and films, mold release sprays, and lubricants. They may be used to confer soil release properties to articles such as wall panels, fabrics and carpets. They are especially useful for conferring low surface tensions when used in blends with higher surface tension polymers. A preferred composition comprises the interpolymers blended with about 10–90% by weight of polyvinyl fluoride.

TEST METHODS

Polymer Composition

Polymer composition was determined by $^{19}$F-nmr measuring the spectrum at 235.4 MHz of each polymer dissolved in dimethylacetamide at 130° C. Integration of signals near −80 ppm arising from $CF_3$ groups was used to measure the amount of HFP, PFBE or PEVE in the polymer. Integration of complex sets of signals from −105 to −135 ppm for $CF_2$ groups from TFE units in the terpolymer, corrected for the $CF_2$ content contributed by any other monomer, and from −150 to −220 ppm for CHF groups from the VF units in the terpolymer corrected for the CF content contributed by any other monomer when present provided complete compositional data for each sample. Infrared spectroscopy was used to identify the presence of ionic end groups.

Melt Viscosity

Melt viscosity was used as a relative measure of molecular weight. The melt viscosities of some of the polymers were extremely high and exhibited extreme melt fracture when extruded from the die of the capillary rheometer. This gave erratic results. In order to obtain a reliable measurement, mixtures of 40 weight % polymer in dimethylacetamide were used with the rheometer operated at 150° C. Viscosities were measured at shear rates ranging from 23.4 sect$^{-1}$ to 3516 sect$^{-1}$. Logarithmic plots of these data were fit to a linear least squares equation which was then used to calculate the viscosity at 100 sec$^{-1}$. This value is reported as MV.

Melting Point

Melting points were measured in air by differential scanning calorimetry (DSC). Because the thermal history of the sample can affect the measurement of $T_m$, samples were heated to 250° C. at 10° C./min, then cooled and reheated at 10° C./min. The peak temperature of the endotherm observed during the reheat of the sample is reported as $T_m$.

Heat of Fusion

Heat of fusion of the polymer was determined by integrating the area nder the melting endotherm recorded by the DSC and is reported as $\Delta H_f$ in J/g.

Haze Measurement

Haze measurements were made on film with a Hunter Lab Ultra Scan spectrocolorimeter manufactured by Hunter Associates Laboratory, Reston, Va. operated as described in the instrument instruction manual. Haze is reported as the percent diffuse transmission of total light transmission for the sample and provides an index of light scattering by the sample.

Surface Tension

Film surface tension measurements were made by the harmonic mean method of Wu (S. Wu, J. Poly. Sci., Part C, [34], 19, [1971]) using water and methylene iodide as the probe liquids.

Dispersion Viscosity Disp ersion viscosities were determined using a Brookfield cone and plate viscometer, Model DV-1 supplied by Brookfield Engineering Laboratories of Stoughton, Mass. operated according to manufacturer's instructions.

Surface Composition Analysis

The surface composition of cast films was determined by means of electron spectroscopy for chemical analysis (ESCA). This technique measured the relative abundance of different atoms on the film surfaces except for hydrogen. Electrons ejected from the sample at an exit angle of 30° were analyzed and are characteristic of the sample surface composition to a depth of about 50 Å. The electrons from the carbon atoms present a complex signal which is especially useful because the shape of this signal can be analyzed to determine different bonding environments for the carbon in the sample. For this invention, it was possible to estimate the portion of the carbon signal on the film surface, arising from the carbon in $CF_3$ groups for terpolymers containing PFBE.

EXAMPLES

Examples 1–12

Terpolymers with Cationic End Groups

A stirred jacketed horizontal stainless steel autoclave of 3.8 L (1 U.S. gal) capacity was used as the polymerization vessel. In each case the autoclave was equipped with instrumentation to measure temperature and pressure and with a compressor that could feed monomer mixtures to the autoclave at the desired pressure. The autoclave was filled to 70–80% of its volume with deionized water, then pressured to 2.1 MPa (300 psi) with nitrogen and vented three times. The water was then heated to 70° C. and VF (vinyl fluoride) and TFE (tetrafluoroethylene) monomers in the desired ratio were used to bring the autoclave pressure to 2.1 MPa. Initiator solution was then injected, 1.5 g V-50 initiator 2,2'-azobis(2-amidinopropane) dihydrochloride, Wako Chemical Co., Dallas, Tex.) in 50 mL of water, into the autoclave. The autoclave was operated in a semibatch fashion in which the desired VF and TFE mix was added to the reactor as polymerization occurred to maintain constant pressure. To do this, the monomer feed was recycled through a loop from the high pressure side of the compressor to the low pressure side. Some of this recycle monomer stream was admitted to the autoclave by means of an automatic pressure regulated valve. Fresh monomer feed was added in the desired ratio to the balance of the recycle stream on the low pressure side of the recycle loop to make up for the material sent to the reactor. When terpolymers containing monomers of perfluorobutyl ethylene (PFBE) or perfluoroethyl vinyl ether (PEVE) were made these monomers were fed to the autoclave separately as liquids by means of a pump. All monomer feeds were maintained until the predetermined amount was fed to obtain the desired solids in the autoclave. When hexafluoropropylene (HFP) was used as the termonomer, 50 g was injected into the reactor in one shot after about 10% of the total VF and TFE monomers had been fed. VF and TFE monomer feeds were continued until a predetermined amount to give the final latex solids was fed to the autoclave. About 2 to 4 hours was required to complete each polymerization depending on the termonomer used. The feed was then stopped and the contents of the autoclave were cooled and pressure was vented. The polymer latex was easily discharged to a receiver as a milky homogeneous mixture. Polymer was isolated on a suction filter by adding trisodium citrate to the solution in an amount sufficient to raise the pH to about 6.0, and dried in an air oven at 90°–100° C. The V-50 initiator used provided polymer with cationic endgroups of 2-amidinopropane hydrochloride . Data for each example showing reactor conditions and the polymer produced by those conditions are presented in Table 1.

Casting dispersions of polymer were prepared by adding 8.0 g of polymer and 15.0 g of propylene carbonate into a bottle along with 25 g of stainless steel shot about 0.32 cm diameter. The bottles were tightly stoppered and placed on a paint shaker and milled for 15 minutes to yield uniform dispersions without polymer lumps. In some cases, particularly for the resins with very low surface energies, the dispersions tended to retain bubbles after milling. This was remedied by adding a small amount of methanol, ca. 5 mL, to the dispersion to facilitate bubble release. Portions of the dispersions were then poured onto a sheet of polyester film held on a flat vacuum plate and drawn down with the aid of a doctor knife to yield a thin uniform coating. The coated film was clamped into a frame and placed into a forced draft air oven heated to 204° F. for three minutes. The film was removed from the oven and the frame, and the dry fluoropolymer film was stripped from the polyester. Each fluoropolymer film was 1 mil thick. Part of the film was used to measure haze and part was used to measure surface tension.

Examination of the data in Table 2 shows decreases in both the melting point and heat of fusion for the terpolymers as the concentration of termonomer increases. These results demonstrate that the termonomer is disrupting the crystalline structure of the polymer, and that the effect is generally in proportion to the amount of termonomer incorporated into the polymer. Thus, the terpolymers of the invention have lower crystallinity than the copolymer of equivalent [VF]/[TFE]. As a consequence of the reduced crystallinity, certain practical advantages for the terpolymers have been observed.

For example, the data in Table 2 also show a precipitous drop in film haze after the first increment of termonomer is incorporated into the polymer. There is a general tendency for the polymer films with the lower haze to have higher termonomer content, and thus correlate with the decrease in polymer crystallinity.

It was found that the terpolymers form stable solutions at room temperature in common polar organic solvents like ketones, esters and some ethers when sufficient termonomer is incorporated into the polymer. The data in Table 2 report terpolymers soluble in THF, for example. These solutions were prepared by warming polymer and solvent in bottles to about 70° C. and shaking them frequently. When dissolution was complete and the solutions were allowed to cool to room temperature they remained homogeneous fluids that were coated onto glass plates and allowed to dry in air at ambient temperatures. Clear glossy coatings well-adhered to the glass were formed for the resins denoted as soluble in Table 2. The insoluble resins remained as finely divided particulates even when warmed in THF and only formed white powdery coatings upon air drying that were easily wiped away from the glass plates.

The data in Table 2 also illustrate the effect the termonomer has on the surface tension of films and coatings made from the terpolymers. It was noted that the surface tension decreases as the termonomer content of the polymer increases. Low surface tensions are well known in the art, see for example Inoue, et al., J. Appl Polym. Sci., 40, 1917 (1990), to confer superior release properties to films and coatings making these valuable materials for items such as release sheets, films or papers, mold release sprays and die lubricants. The low surface tensions also make it difficult for soil and stains to stick to coated surfaces or articles such as wall panels, fabrics and carpets. These terpolymer resins are also especially useful for conferring low surface tensions when used in blends with higher surface tension polymers.

TABLE 1

Conditions for Terpolymer Preparation

Reactor Conditions

| Example No. | Reactor Pres psig | Reactor Temp ° C. | Termon-omer | Termonomer Feed Rate gpm | TFE Feed Rate gpm | VF Feed Rate gpm | Total Monomer Fed g | Reactor Solids wt % |
|---|---|---|---|---|---|---|---|---|
| 1 | 297 | 69.9 | PFBE | 0.26 | 2.08 | 1.17 | 490.0 | 14.9 |
| Control 2 | 291 | 70.0 | NONE | 0.26 | 2.08 | 1.17 | 550.1 | 13.5 |
| 3 | 291 | 69.8 | PFBE | 0.13 | 2.15 | 1.21 | 544.4 | 13.6 |
| 4 | 292 | 69.5 | PFBE | 0.26 | 2.08 | 1.17 | 545.9 | 13.1 |
| 5 | 297 | 70.3 | PFBE | 0.40 | 2.00 | 1.13 | 549.9 | 13.0 |
| 6 | 295 | 70.3 | PFBE | 0.26 | 2.08 | 1.26 | 545.0 | 13.5 |
| 7 | 290 | 69.8 | PFBE | 0.30 | 1.50 | 0.84 | 548.0 | 13.4 |
| Control 8 | 290 | 70.0 | NONE | 0.00 | 2.24 | 1.26 | 537.1 | 14.7 |
| 9 | 295 | 70.4 | HFP | 50.0* | 2.24 | 1.26 | 535.0 | 15.6 |
| 10 | 294 | 70.3 | HFP | 50.0* | 2.24 | 1.26 | 540.2 | 14.5 |
| 11 | 298 | 70.0 | PEVE | 0.26 | 2.08 | 1.26 | 545.5 | 13.5 |
| 12 | 299 | 70.2 | PEVE | 0.39 | 2.00 | 1.13 | 544.2 | 13.0 |

Polymer Produced

| Example No. | Polymer Made g | VF Conc mol % | TFE Conc mol % | Termon Conc mol % | MV Pa.s |
|---|---|---|---|---|---|
| 1 | 416.8 | 58.0 | 39.9 | 2.06 | 299 |
| Control 2 | 379.0 | 59.7 | 40.3 | 0.00 | 787 |
| 3 | 383.1 | 60.0 | 39.6 | 0.41 | 629 |
| 4 | 371.6 | 58.3 | 40.6 | 1.12 | 576 |
| 5 | 372.3 | 58.4 | 38.4 | 3.21 | 155 |
| 6 | 383.3 | 60.8 | 37.0 | 2.20 | 314 |
| 7 | 383.4 | 57.8 | 38.7 | 3.51 | 123 |
| Control 8 | 473.9 | 58.4 | 41.6 | 0.00 | 556 |
| 9 | 508.3 | 60.0 | 39.1 | 0.94 | 789 |
| 10 | 466.4 | 60.5 | 38.5 | 1.02 | 914 |
| 11 | 378.8 | 61.7 | 37.7 | 0.61 | 393 |
| 12 | 365.0 | 59.7 | 39.4 | 0.94 | 402 |

*All 50 g of HFP injected into the reactor after 10% of TFE was fed.

TABLE 2

Vinyl Fluoride Terpolymer Properties

| Example No. | VF (mol %) | TFE (mol %) | PFBE (mol %) | HFP (mol %) | PEVE (mol %) |
|---|---|---|---|---|---|
| 1 | 58.0 | 39.9 | 2.06 | | |
| Control 2 | 59.7 | 40.3 | 0.00 | | |
| 3 | 60.0 | 39.6 | 0.41 | | |
| 4 | 58.3 | 40.6 | 1.12 | | |
| 5 | 58.4 | 38.4 | 3.21 | | |
| 6 | 60.8 | 37.0 | 2.20 | | |
| 7 | 57.8 | 38.7 | 3.51 | | |
| Control | 58.4 | 41.6 | | 0.00 | |
| 9 | 60.0 | 39.1 | | 0.94 | |
| 10 | 60.5 | 38.5 | | 1.02 | |
| 11 | 61.7 | 37.7 | | | 0.61 |
| 12 | 59.7 | 39.4 | | | 0.94 |

TABLE 2-continued

Vinyl Fluoride Terpolymer Properties

| Example No. | $T_m$ (° C.) | $\Delta H_f$ (J/G) | Haze (%) | Surface Tension (dyne/cm) | Solubility THF* |
|---|---|---|---|---|---|
| 1 | 184 | 20.1 | 3.67 | 22.2 | soluble |
| Control 2 | 200 | 26.5 | 8.65 | 25.5 | insoluble |
| 3 | 192 | 22.2 | 3.45 | 23.5 | insoluble |
| 4 | 190 | 20.0 | 3.21 | 22.5 | soluble |
| 5 | 160 | 13.3 | 1.03 | 18.6 | soluble |
| 6 | 172 | 18.1 | 0.87 | 22.5 | soluble |
| 7 | 161 | 13.5 | 0.73 | 20.7 | soluble |
| Control 8 | 204 | 26.4 | 7.10 | 30.8 | insoluble |
| 9 | 191 | 23.7 | 3.89 | 36.9 | insoluble |
| 10 | 191 | 22.6 | 0.41 | 27.3 | insoluble |
| 11 | 190 | 24.7 | 3.57 | 25.2 | soluble |
| 12 | 190 | 21.1 | 3.42 | 25.8 | soluble |

*Solutions are 5% (w/v) polymer in THF except 1, 11 and 12 which are 2.5% (w/v)

Examples 13–16

Terpolymer Blends

Table 3 shows blends of PVF made with VF/TFE copolymer from Control Example 2 and with terpolymers from Examples 6 and 7. A small amount of Syloid® 308 amorphous silica, based on the weight of polymer, was added as a delusterant. Dispersions were prepared by milling the weight proportions of each component given in Table 3 with sufficient propylene carbonate to give a final dispersion of 35% solids, and films were cast according to the procedures above. The film made from only PVF had a surface tension of 40.1 dynes/cm. A sharp decreases in film surface tension was observed and its strong dependence on the presence of the terpolymers even though they only accounted for a minor portion of the film. The surface tension of 19 dyne/cm observed for the film blend of Example 16 is about the same as that for polytetrafluoroethylene.

The surface composition of films cast from blends of fluoropolymers by means of electron spectroscopy for chemical analysis (ESCA)was investigated. In this way, it was possible to estimate the portion of the carbon signal on the film surface arising from the carbon in $CF_3$ groups for terpolymers containing PFBE. The atom percentage composition, excluding hydrogen, and the mole percentage $CF_3$ groups measured by ESCA is presented in Table 4. A small amount of oxygen on the film surface in addition to the expected carbon and fluorine was found. This may be the result of some oxidation of the polymer during film preparation. No significant amount of silicon was detected indicating that the silica particles are all internal to the film.

For comparison, the atom percentage and percentage $CF_3$ groups for the bulk sample were calculated from the known polymer compositions and their amounts used to make the blends. These results are also reported in Table 4. There is a close correspondence of the calculated composition for the control film (Example 13, made from only PVF), to the composition measured by ESCA. Since there are no $CF_3$ groups in this sample none were calculated or found. It was found that for the films made with blends of PVF with copolymer, Control Example 14, or with terpolymer, Examples 15 and 16, that the measured fluorine and $CF_3$ content of the surface is much higher than for the bulk sample and that the measured carbon content is much lower than for the bulk sample. These results show that the copolymer and terpolymers, which have higher fluorine and lower carbon content than PVF, tend to segregate to the surface of the film. Furthermore, the observed $CF_3$ content is eightfold higher than that of the bulk composition indicating an extremely strong segregation of polymer segments containing PFBE to the film surface. The segregation of the fluorine rich polymers in the blend to the film surface results in the very low surface tensions observed in these cases.

TABLE 3

Terpolymer Blends

|  | Control 13 | Control 14 | 15 | 16 |
|---|---|---|---|---|
| PVF | 100 | 85 | 85 | 85 |
| VF/TFE from Example 2 | — | 15 | — | — |
| VF/TFE/PFBE from Example 6 | — | — | 15 | — |
| VF/TFE/PFBE from Example 7 | — | — | — | 15 |
| Syloid ® 308 silica (wt %) | 4 | 4 | 4 | 4 |
| Surface Tension (dyn/cm) | 40.1 | 30.1 | 22.5 | 19.0 |

TABLE 4

Surface Analysis of Polymer Blends

| | Calculated Bulk Composition | | | Measured Surface Composition | | | |
|---|---|---|---|---|---|---|---|
| Example No. | Atom % F | Atom % C | % $CF_3$ | Atom % F | Atom % C | Atom % O | % $CF_3$ |
| 13 (Control) | 33 | 67 | — | 30 | 69 | 0.7 | — |
| 14 (Control) | 36 | 64 | — | 41 | 58 | 0.5 | — |
| 15 | 36 | 64 | 0.11 | 49 | 51 | 0.3 | 0.9 |
| 16 | 36 | 64 | 0.17 | 50 | 50 | 0.3 | 1.4 |

Examples 17–20

TERPOLYMER WITH NONIONIC INITIATOR

These examples show that the improvement in haze found by incorporating a termonomer into the polymer made by an aqueous process using an ionic initiator was also realized when polymer was made in a nonaqueous solvent using a nonionic initiator. These results show that the improved haze is inherent to the terpolymer relative to the copolymer and not dependent upon the process used to make the polymer.

To a 400 mL Hastaloy high pressure tube was added 200 mL 1,1,2-trichloro-1,2,2-trifluoroethane which contained perfluorobutylethylene in the amount specified in Table 5 and 0.10 g Vazo® 64 initiator [azo(bis-i-butyronitrile), DuPont Co., Wilmington, Del.]. The tube was closed and cooled in an acetone dry ice slush, then evacuated and flushed with nitrogen three times to deoxygenate the contents of the tube. Vinyl fluoride and tetrafluoroethylene were then weighed into the tube in the amounts specified in Table 5, and the charged tube was placed in a thermostated shaker. The contents of the tube were heated to 80° C. and shaken for 3 hours. During that time the initial pressure in tube was in the range 1.9–2.6 MPa (275–380 psi) which dropped into the range 1.2–2.4 MPa (167–3448 psi) as the polymerization proceeded. The tube was cooled to room temperature and excess monomers were vented. The polymer was separated from the solvent by centrifugation and was then dried at 90–100° C. in an air oven.

Polymer composition was determined by 19F-nmr measuring the spectrum at 235.4 MHz of each polymer dissolved in dimethylacetamide at 130° C. Integration of signals near −80 ppm arising from CF3 groups was used to measure the amount of PFBE in the polymer. Integration of complex sets of signals from −105 to −135 ppm for CF2 groups from TFE units in the copolymer, corrected for the CF2 content contributed by the termonomer, and from −150 to −220 ppm for CHF groups from the VF units in the copolymer provided complete compositional data for each sample. The results are reported in Table 5.

Melting points were measured in air by DSC heated at a rate of 10° C./min.

The peak melting temperature is reported as $T_m$ in Table 5.

Films were prepared by placing polymer between sheets of Kapton® (polyimide) film and then into a heated hydraulic press where the polymer was heated to a temperature 20–50° C. above its melting point under an applied pressure of about 1.4 MPa (2000 psi). The pressed films were cooled under pressure, removed from the press and separated from the Kapton® sheets.

Haze measurements were made on the pressed film with a Hunter Lab Ultra Scan spectrocolorimeter manufactured by Hunter Associates Laboratory, Reston, Va., operated as described in the instrument instruction manual. Haze is reported as the percent diffuse transmission of total light transmission for the sample and provides an index of light scattering by the sample. These results are reported in Table 5 and clearly show a significant decrease in haze relative to the VF/TFE terpolymer as the amount of perfluorobutyl ethylene in the terpolymer increases.

TABLE 5

| | | 17 (Control) | 18 | 19 | 20 |
|---|---|---|---|---|---|
| Charge to Tube | | | | | |
| VF | g | 15 | 15 | 15 | 15 |
| TFE | g | 30 | 30 | 30 | 30 |
| PFBE | g | 0 | 2.0 | 5.0 | 8.0 |
| V-50 | g | 0.10 | 0.10 | 0.10 | 0.10 |
| Product | | | | | |
| Polymer | g | 28.4 | 19.1 | 8.5 | 5.3 |
| VF | mol % | 54.9 | 53.9 | 51.6 | 49.5 |
| TFE | mol % | 45.1 | 44.6 | 43.7 | 42.8 |
| PFBE | mol % | 0 | 1.5 | 4.8 | 7.8 |
| $T_m$ | ° C. | 208 | 187 | 157 | 132 |
| Haze | % | 76.9 | 8.6 | 6.3 | 4.1 |

Examples 21–24

A stirred jacketed stainless steel horizontal autoclave of 7.6 L (2 U.S. gal) capacity was used as the polymerization vessel. The autoclave was equipped with instrumentation to measure temperature and pressure and with a compressor that could feed monomer mixtures to the autoclave at the desired pressure. The autoclave was filled to 55–60% of its volume with deionized water containing 15 g of Zonyl® FS-62 surfactant [DuPont Co., Wilmington, Del.] and heated to 90° C. It was then pressured to 3.1 MPa (450 psig) with nitrogen and vented three times. The autoclave was precharged with monomers in the percentage compostion shown in the Table 6 below, and brought to the working pressure of 3.1 MPa (450 psig). Initiator solution was prepared by dissolving 2 g ammonium persulfate in 1 L of deionized water. The initiator solution was fed to the reactor at a rate of 25 mL/min for a period of five minutes and then the rate was reduced and maintained at 1 mL/min for the duration of the experiment. The autoclave was operated in a semibatch fashion in which a monomer mixture was added to the reactor to maintain constant pressure as polymerization occurred. The composition of this make-up feed was different from the precharged mixture composition of this make-up feed because of the differences in monomer reactivity. The composition was selected to maintain a constant monomer composition in the reactor so compositionally homogeneous product would be formed.

Make-up monomer feed as indicated in Table 6 was recycled through a loop from the from the high pressure side of the compressor to the low pressure side. A side stream of monomer from this loop was admitted to the autoclave by means of an automatic pressure regulated valve to maintain reactor pressure. Fresh monomer feed was simultaneously added in the desired ratio to the recycle stream on low pressure side of the loop to replace the material sent to the reactor. Monomer feeds were continued until the total monomer amount indicated in Table 6 was reached. About 2–4 hours was required to complete each polymerization. The feed was then stopped and the contents of the autoclave were cooled and vented. The polymer latex was easily discharged to a receiver as a milky homogeneous mixture. Polymer was isolated on a suction filter after adding 15 g of ammonium carbonate dissolved in water per liter of latex followed by 70 mL of HFC-4310 (1,1,1,2,3,4,4,5,5,5-decafluoropentane) per liter of latex with rapid stirring. The filter cake was washed with water and dried in an air over at 90–100° C. Data for each polymer produced is presented in Table 6.

TABLE 6

| Reactor Conditions | | | | | | | |
|---|---|---|---|---|---|---|---|
| | Precharge Monomer Comp (wt %) | | | | Make-up Monomer (wt %) | | |
| Example | TFE | VF | HFP | Ethane | TFE | VF | HFP |
| 21 | 29.8 | 4.8 | 65.3 | 0 | 53.8 | 25.8 | 20.4 |
| 22 | 44.6 | 3.1 | 52.3 | 5 | 63.7 | 20.7 | 15.6 |
| 23 | 9.0 | 3.0 | 88.0 | 0 | 29.0 | 25.0 | 46.0 |
| 24 | 44.5 | 3.6 | 51.8 | 0 | 65.1 | 20.0 | 14.8 |

| Example | Total Monomer (g) | Reactor Solids (%) | Polymer Made (g) |
|---|---|---|---|
| 21 | 1576.4 | 18.7 | 1031 |
| 22 | 1386.4 | 17.4 | 947 |
| 23 | 1701.6 | 18.3 | 1063 |
| 24 | 1612.4 | 27.4 | 1771 |

| Polymer Properties | | | | | | | | |
|---|---|---|---|---|---|---|---|---|
| | Polymer Comp (mol %) | | | Polymer Comp (wt %) | | | $T_m$ | MV |
| Example | TFE | VF | HFP | TFE | VF | HFP | (° C.) | Pa.s |
| 21 | 45.4 | 41.4 | 13.2 | 53.9 | 22.6 | 23.4 | 116 | 2322 |
| 22 | 58.0 | 34.5 | 7.6 | 68.1 | 18.6 | 13.3 | 178 | 1327 |
| 23 | 26.2 | 46.4 | 27.5 | 29.5 | 24.1 | 48.4 | amorph | — |
| 24 | 55.7 | 35.7 | 8.7 | 65.4 | 19.3 | 15.3 | 170 | 1983 |

What is claimed is:

1. An interpolymer consisting essentially of units derived during polymerization from vinyl fluoride and at least two highly fluorinated monomers, at least 30 mol % of said units being derived during polymerization from vinyl fluoride and at least one of said highly fluorinated monomers introducing into the polymer a side chain of at least one carbon atom.

2. The interpolymer of claim 1 wherein said interpolymer consists essentially of units derived during polymerization from 30–60 mol % vinyl fluoride and 10–60 mol % of at least one $C_2$ olefin selected from the group consisting of vinylidene fluoride, tetrafluoroethylene, trifluoroethylene, and chlorotrifluoroethylene, and 0.1 to 30 mol % of a highly fluorinated monomer which introduces into the polymer a side chain of at least one carbon atom.

3. The interpolymer of claim 2 where said highly fluorinated monomer which introduces into the polymer a side chain of at least one carbon atom is selected from the group consisting of highly fluorinated vinyl ethers, perfluoroolefins having 3–10 carbon atoms, perfluoro$C_1$–$C_8$alkyl ethylenes and fluorinated dioxoles.

4. The interpolymer of claim 1 which consists essentially of vinyl fluoride, tetrafluoroethylene and a perfluoroolefin of 3–10 carbon atoms.

5. The interpolymer of claim 4 where the perfluoroolefin is hexafluoropropylene.

6. The interpolymer of claim 1 which consists essentially of vinyl fluoride, tetrafluoroethylene and a perfluoro$C_1$–$C_8$ alkyl ethylene.

7. The interpolymer of claim 6 where the perfluoro$C_1$–$C_8$ alkyl ethylene is perfluorobutyl ethylene.

8. The interpolymer of claim 1 which consists essentially of vinyl fluoride, tetrafluoroethylene, and a perfluoro(alkyl vinyl ether) wherein the alkyl group is of 1–8 carbon atoms.

9. The interpolymer of claim 8 where the perfluoro(alkyl vinyl ether) is perfluoro(ethyl vinyl ether).

10. The interpolymer of claim 1 blended with about 10–90% by weight of polyvinyl fluoride.

11. The interpolymer of claim 1 wherein said interpolymer is a substantially random interpolymer.

12. The interpolymer of claim 1 having ionic end groups.

13. The interpolymer of claim 1 in the form of particles having an average diameter of about 200 nm to 400 nm.

14. The interpolymer of claim 13 wherein said particles have a size distribution in which 90% of the particles are within plus or minus 10% of the average particle diameter.

15. The interpolymer of claim 13 wherein said particles have a size distribution in which 90% of the particles are within plus or minus 5% of the average particle diameter.

16. The interpolymer of claim 13 wherein said particles are substantially spherical such that the ratio of the average diameter of the particles along the major and minor axes is from 1.0:1 to 1.3:1.

17. A shaped article formed from said interpolymer of claim 1.

* * * * *